UNITED STATES PATENT OFFICE.

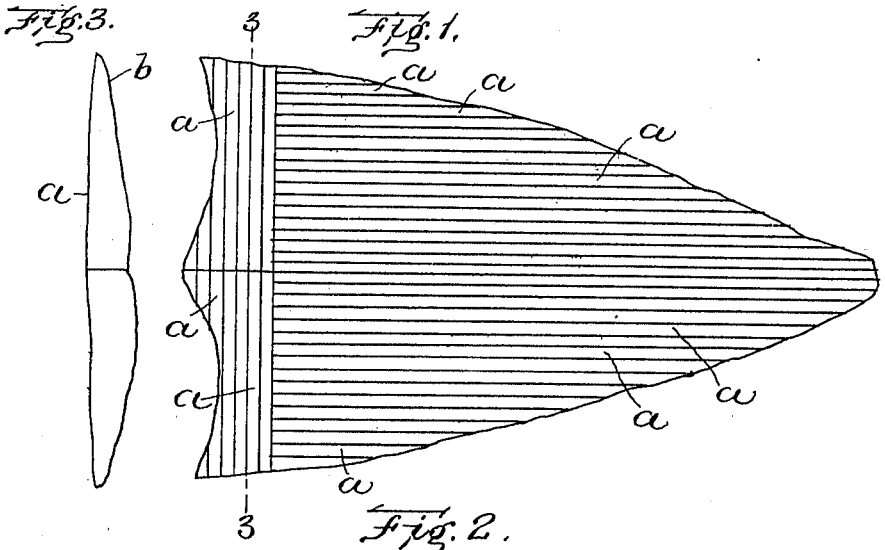

OSCAR ANDREWS, OF GLOUCESTER, MASSACHUSETTS, ASSIGNOR, BY MESNE ASSIGNMENTS, TO SUSANNA L. ANDREWS, OF GLOUCESTER, MASSACHUSETTS.

PACKING FISH.

978,685.  Specification of Letters Patent.  Patented Dec. 13, 1910.

Application filed April 16, 1909. Serial No. 490,251.

*To all whom it may concern:*

Be it known that I, OSCAR ANDREWS, of Gloucester, in the county of Essex and State of Massachusetts, have invented certain new and useful Improvements in Packing Fish, of which the following is a specification.

This invention relates to salt fish prepared for the market by subdividing the edible portions of the body of the fish into sections, assembling a suitable number of the sections in a mold, and applying pressure to the mass of sections to compact the same within the mold and form a marketable cake or block, the pressed block being suitably wrapped or otherwise confined to make its form reasonably permanent after removal from the mold.

It is well known that there is a considerable quantity of albuminous matter in the form of minute particles or globules between the fibers composing the main portion of the edible body of fish, and this is particularly true of codfish. The albuminous particles can be readily seen by the microscope. When the fish is cut into strips with a sharp knife the smooth cut surfaces thus formed present both the fibrous and the albuminous constituents. Heretofore, the sections into which the body of the fish is subdivided have been formed without regard to uniformity of thickness of the sections, and without making provision for bringing together, in assembling the sections, cut faces on which are exposed both the fibrous and the albuminous constituents of the fish, there being a considerable number of sections, each having one side or surface which is not formed by a cutting operation, but by the removal of the skin, each of these sections having a side formed by the thin membrane which is interposed between the edible portion of the body and the skin, the latter being in all cases removed prior to the subdivision of the edible portion into sections. When sections having the membrane upon one side are incorporated into a mass pressed in a mold, the membrane acts as an impervious barrier preventing the escape of moisture from the body of the cake by the molding pressure. The result is the retention of an undesirable quantity of moisture in the fish after the pressing operation, and failure of the different sections or units of the package to firmly cohere in the completed block. The presence of moisture within the compressed block hastens putrefaction and decay, especially in a hot and moist climate, such as prevails in many latitudes during the so-called "dog days." To prevent or minimize this difficulty, it has been found necessary to apply an antiseptic or anti-putrescent powder, which is usually sprinkled upon the faces of the whole fish before subdivision, and upon the subdivisions of the same, as well as upon the surfaces of the pressed blocks.

My invention has for its object to enable all objectionable moisture to be expressed from the interior of a cake or block to the surface thereof by the molding pressure, and to insure the formation on each section or unit of two opposite cut surfaces on which are exposed both the fibrous and the albuminous constituents, so that when the units are pressed together, they will adhere firmly to each other by reason of the union between the albuminous constituents of the contacting units, there being no membrane barriers between any of the individual subdivisions, and therefore nothing to prevent the passage of moisture outwardly from all parts of the body of the cake or block under the influence of the molding pressure. A cake or block prepared in accordance with my invention is therefore free from objectionable internal moisture and is practically impervious to air, and is capable of withstanding the action of a relatively warm and humid atmosphere without the use of preservative agents applied to the surfaces of the individual units, the only preservative, if any is required, being applied to the exterior surfaces of the cake or block, from which it can be readily removed.

My invention consists in the improvements which I will now proceed to describe and claim, said improvements including the subdivision of the fish into relatively thin slices constituting the units of the cake or block, each slice having two opposite cut sides on which are exposed both the albuminous and the fibrous constituents of the fish, and the cut surfaces of the slices being in contact with each other, and pressed firmly together in the completed cake or block.

Of the accompanying drawings, forming a part of this specification, Figure 1 represents a side view of a split salt fish prepared in the usual or any suitable way, the parallel lines on said figure indicating the lines along which the edible portion may be cut to subdivide it into slices. Fig. 2 represents a sectional view of a mold in which a mass of the slices have been assembled and pressed into a cake or block. Fig. 3 represents a section on line 3—3 of Fig. 1. Fig. 4 represents a perspective view of one of the slices cut crosswise from the neck portion of the body of the fish. Fig. 5 represents a perspective view of a slice cut lengthwise from the body of the fish.

The same reference characters indicate the same parts in all the figures.

In carrying out my invention, I first extract from wet or dry salt fish, from which the skins have been removed, the greater part of the bones in weight and number, and then cut the fish into relatively thin slices $a, a$, each of substantially uniform thickness. This operation may be performed by means of a gang of disk knives suitably spaced apart on a rotary hub or shaft, and arranged in suitable relation to a rotary feed roll or drum, the arrangement being such that when the edible body of a fish, or a suitable portion of said body, is passed between the gang of knives and the drum, it will be subdivided by the knives into the slices $a$. The approximately triangular body $b$ of the split salt fish may be first subdivided into two or more parts before being further subdivided into the slices $a$, and said slices may extend either lengthwise, crosswise, or diagonally. The cut faces are so formed that their area is determined by the thickness of the portion of the body from which they are cut. The knives are preferably so spaced apart as to form slices of about an eighth of an inch thick, although the thickness may be greater or less, as may be desired. It will be seen that each slice has two opposite cut faces formed by the knives, and that upon each of the cut faces is exposed both the fibrous and the albuminous constituents. A suitable number of slices are then assembled in a mold $c$, the slices being arranged in superposed layers with their cut faces in contact with each other, as indicated in Fig. 2. Pressure is then applied to the mass of slices until the mass is suitably compacted, and the cut faces of the slices pressed firmly against each other, the albuminous matter contained in the slices causing a close adhesion between each slice and those with which it is in contact.

Owing to the fact that there are no considerable areas of waterproof membrane between any of the slices, practically all the excess internal moisture contained in the mass is expelled and passes to the surface of the block or cake, the structure of the slices between their cut faces being such that moisture can pass outwardly from the central portion of the cake, through the slices between the central portion and the surfaces of the cake, the moisture accumulating upon the surfaces of the cake, from which it is subsequently evaporated. It is therefore entirely feasible to express practically all the moisture from the cake, the pressure at the same time causing the cut faces of the slices to adhere closely and firmly to each other.

I am aware that salt fish has been subdivided into sections of irregular or varying thickness, and that these sections have been assembled and subjected to pressure in molds, without provision for giving each section two opposite cut surfaces and a uniform thickness, many of the sections having the above mentioned membrane on one side or surface.

I am the first, so far as I am aware, to cut the edible portion of a salt fish into relatively thin slices of practically uniform thickness, each slice having opposite cut faces which expose the fiber and the albuminous matter, to assemble said slices with their cut surfaces in contact with each other, and to press them together before time is allowed for the slices to dry and become hard and brittle, to form a block or cake, the slices being caused to adhere to each other by the contact of the albuminous matter exposed on their cut faces.

I am also aware that salt fish has been ground or shredded and packed in boxes. This product, however, is lacking in the desirable qualities that distinguish my product, hereinbefore described, it being quickly dried and rendered hard and tasteless. Moreover, consumers naturally prefer a product in which the natural texture of the fish is present, ground or shredded fish being open to the objection that the presence of adulterations therein is not easily detected.

It should be borne in mind that in forming the slices $a$, the cuts extend through the thickness of the body of the fish, or from one flat side to the other, so that the width of each slice represents the thickness of the body of the fish. The general shape of a slice cut from the thick portion of the larger end of the fish extending from the median line to one of the edges is shown in perspective in Fig. 4, where $a'$ represents one of the cut faces, the slice having a similar cut face on its opposite side. A slice cut lengthwise of the fish or parallel with the median line is shown in Fig. 5. Some of the slices may be arranged parallel with the walls of the mold, as shown in Fig. 2.

It is obvious that some of the slices of which the pressed cake or block is composed may differ in thickness from other slices of the same cake, that is to say, some slices may be thinner or thicker than others, the essential feature being that each slice be of substantially uniform thickness throughout its entire area, so that moisture may be expressed uniformly from all parts by the compacting pressure. I desire it to be understood, therefore, that slight variations in the spacing of the knives, resulting in corresponding variations in the thickness of the slices into which the fish is subdivided, will be no departure from the spirit of my invention.

I claim:

1. The method of making cakes or blocks of salt fish, the same consisting in cutting the edible portions of the body of a fish into relatively thin slices each of substantially uniform thickness, each slice having cut faces on its opposite sides on which are exposed both the fibrous and the albuminous constituents of the fish, assembling the slices in superposed layers with the cut faces of the slices of each layer in contact with the cut faces of contiguous layers, and subjecting the mass to moisture-expelling and cake-forming pressure, the moisture passing outwardly from all portions of the cake to the surface thereof through the body portions and cut faces of the slices, while the albuminous matter exposed on the cut faces causes the subsequent adhesion of the slices to each other, and the exclusion of air from the body portions of the slices.

2. As an article of manufacture, a compressed cake or block composed of relatively thin slices of substantially uniform thickness cut from the edible portions of salt fish assembled in superposed layers with the cut surfaces of each layer in contact with the cut surfaces of contiguous layers, each layer being of substantially uniform thickness.

In testimony whereof I have affixed my signature, in presence of two witnesses.

OSCAR ANDREWS.

Witnesses:
CLIFFORD B. TERRY,
JOHN W. KEEFE.